United States Patent
Huang et al.

(10) Patent No.: US 6,301,059 B1
(45) Date of Patent: Oct. 9, 2001

(54) ASTIGMATIC COMPENSATION FOR AN ANAMORPHIC OPTICAL SYSTEM

(75) Inventors: Sun-Yuan Huang, Blandon, PA (US); Carl Gaebe, Ellicott City, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/479,143

(22) Filed: Jan. 7, 2000

(51) Int. Cl.[7] .................................................. G02B 13/08
(52) U.S. Cl. .......................... 359/668; 359/670; 359/671; 359/710; 359/796
(58) Field of Search ................................. 359/668, 670, 359/671, 710, 796

(56) References Cited

U.S. PATENT DOCUMENTS

| | | | |
|---|---|---|---|
| 2,303,113 | * 11/1942 | Eckel ................................... | 359/710 |
| 3,652,150 | * 3/1972 | Berreman ............................ | 359/710 |
| 3,749,477 | * 7/1973 | Willoughby et al. ............... | 359/671 |
| 3,751,138 | * 8/1973 | Humphrey ........................... | 359/669 |
| 4,017,160 | * 4/1977 | Betensky ............................. | 359/669 |
| 4,203,652 | * 5/1980 | Hanada ................................ | 359/710 |
| 4,253,735 | * 3/1981 | Kawamura et al. ................. | 359/710 |
| 4,318,594 | * 3/1982 | Hanada ................................ | 359/710 |
| 4,362,367 | * 12/1982 | Hammer et al. ..................... | 359/710 |
| 4,530,574 | * 7/1985 | Scifres et al. ....................... | 359/710 |
| 4,744,073 | * 5/1988 | Sugiki ................................. | 359/668 |
| 5,095,386 | * 3/1992 | Scheibengraber ................... | 359/710 |
| 5,181,224 | * 1/1993 | Snyder ................................ | 359/710 |
| 5,467,335 | * 11/1995 | Braat ................................... | 359/710 |
| 5,499,262 | * 3/1996 | Nakata ................................ | 359/668 |
| 5,844,723 | * 12/1998 | Snyder ................................ | 359/668 |
| 5,973,853 | * 10/1999 | Gaebe et al. ........................ | 359/668 |
| 6,088,168 | * 7/2000 | Snyder ................................ | 359/668 |
| 6,088,170 | * 7/2000 | Lee et al. ............................ | 359/710 |

FOREIGN PATENT DOCUMENTS

| | | | | |
|---|---|---|---|---|
| 2921-857-A | * 12/1980 | (DE) | ..................................... | 359/668 |
| 57-204018-A | * 12/1982 | (JP) | ..................................... | 359/668 |
| 61-109015-A | * 5/1986 | (JP) | ..................................... | 359/668 |
| 61-282813-A | * 12/1986 | (JP) | ..................................... | 359/668 |

OTHER PUBLICATIONS

Sun–Yuan Huang, Carl E. Gaebe, Kim A. Miller, Gary T. Wiand, Thomas S. Stakelon, "High Coupling Optical Design for Laser Diodes with Large Aspect Ratio," Proceedings of the 49th Electronic Components and Technology Conference, pp. 912–915, San Diego, CA, Jun. 1–4, 1999.

* cited by examiner

Primary Examiner—Evelyn A Lester
(74) Attorney, Agent, or Firm—Duane, Morris & Heckscher LLP

(57) ABSTRACT

A lens system defined along an X-Y-Z coordinate system transforms an elliptical optical beam defined as exhibiting a first, fast axis component and a second, slow axis component, into an essentially circular optical beam. A first and a second lens intercepts the elliptical beam and a cruciform cylindrical lens is disposed to intercept the output from the second lens. The cruciform cylindrical lens has a fast lens and a slow lens, the fast lens having a first, front cylindrical surface oriented along the X axis of the coordinate system for magnifying the first, fast axis component, the slow lens having a second, rear cylindrical surface oriented along the Y-axis of the coordinate system for magnifying the second, slow axis component, wherein the magnifications are determined to provide an essentially circular output beam, the cruciform cylindrical lens disposed such that the optical beam exiting the second lens impinges the first, front cylindrical surface. At least one of the first lens, the fast lens, and the slow lens is adjusted in the Z-axis of the coordinate system to reduce any astigmatism in the optical beam caused by said transformation.

19 Claims, 7 Drawing Sheets

ASTIGMATIC COMPENSATION FOR AN ANAMORPHIC OPTICAL SYSTEM

CROSS-REFERENCES TO RELATED APPLICATIONS

This Application is related to commonly-owned U.S. patent application Ser. No. 09/073,544, entitled "Cruciform Cylindrical Lens for Elliptical Beam Transformation," filed May 6, 1998, now U.S. Pat. No. 5,973,853, the entirety of which is incorporated herein by reference.

BACKGROUND OF THE INVENTION

1. Field of the Invention

The present invention relates to astigmatic compensation for an anamorphic optical system.

2. Description of the Related Art

Optical transmission systems employing fiber optic cables are often used to transmit data by means of optical signals. Wavelength division multiplexing (WDM) is sometimes used in such systems to increase the capacity of such fiber optic transmission systems. In a WDM system, plural optical signal channels are carried over a single silica based optical fiber with each channel being assigned a particular wavelength. Dense WDM (DWDM) is also increasingly being used.

Erbium-doped optical fiber amplifiers (EDFAs) are often used to amplify light before transmitting the amplified optical signal to the input of an optical fiber of an optical transmission system. EDFAs contain a single-mode optical fiber doped with erbium. The erbium-doped fiber is "pumped" with light at a selected wavelength to provide amplification or gain at wavelengths within the low loss window of the optical fiber. Optical systems and EDFAs typically utilize transmission fibers with a circular core. The input light pumped into to the erbium-doped fiber of the optical amplifier is typically provided by a pump laser module comprising a semiconductor laser diode (pump laser) plus an associated lens system.

A pump laser module typically comprises a pump laser such as a semiconductor laser diode fabricated in a given substrate such as InP or GaAs; an optical lens system for focusing and optically processing the beam; and a fiber for receiving the beam and outputting the beam. The pump laser typically receives an input signal in the form of an electrical current, and outputs an optical beam on the fiber. This fiber is typically fusion-spliced into a single-mode fiber of a wavelength division multiplexing (WDM) device. The fiber of the WDM device may be fusion-spliced to a single-mode erbium doped optical fiber of an optical amplifier. The WDM device combines the pump light and signal light and outputs this to the single-mode erbium doped optical fiber of the optical amplifier. The optical amplifier thus receives coherent light from both pump and signal laser source, and amplifies the relatively low signal light to higher power before transmitting the amplified optical signal to the input of an optical fiber of an optical transmission system. Semiconductor pump laser diodes have therefore become very important components for modem optical communications systems.

There are a variety of semiconductor lasers that emit an elliptical beam. For example, many GaAs-based lasers operating at wavelengths such as 650, 780, 810 and 850 nm all emit an elliptical beam. In particular, a conventional 980 nm GaAs laser, often used as a pump laser source for optical amplification systems, emits such an elliptical beam.

DWDM is emerging as the technology of choice for the backbone of the Internet due to its cost effectiveness in carrying huge data. DWDM-based systems utilize either 980 nm or 1480 nm pump lasers. The shorter wavelength pumping provides a better noise figure, while the longer wavelength provides a higher signal output. The demand for optical pump power in a single mode fiber increases every year. For a DWDM system, for example, the demand for 980 nm pump power has been more than doubled within the past five years from 60 mW to 150 mW.

The 1480 nm pump lasers fabricated from an InP substrate have a near circular cross-sectional output laser beam. However, as noted above, the 980 nm pump lasers fabricated on a GaAs substrate typically have an elliptical emission aperture and thus the laser beam has an elliptical shape or pattern. The 980 nm pump laser has gained popularity due to its high electrical-to-optical conversion efficiency and the low noise figure for the fiber amplifiers. However, since the associated optical systems utilize transmission fibers with a circular core, much of the launched power may be lost. Conventional optical systems will capture only approximately 40% of the launched power from an elliptical beam.

Figure 1:
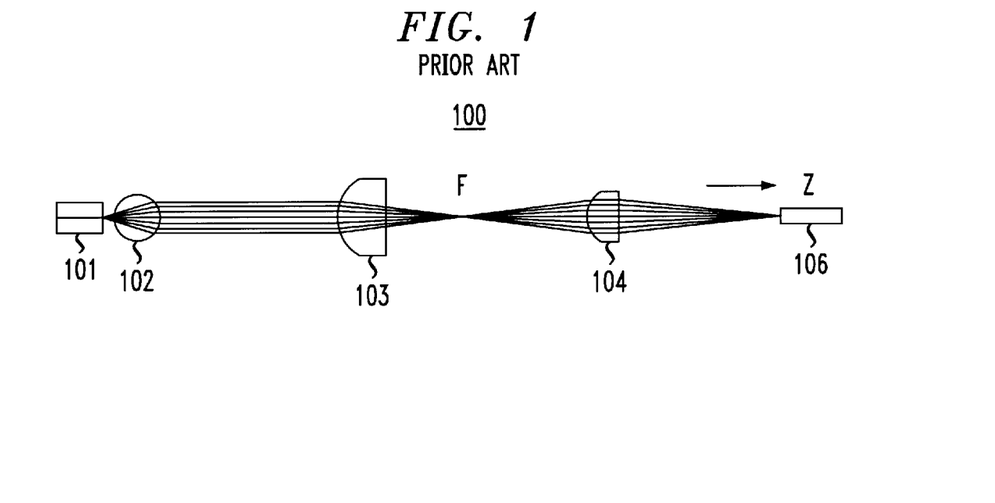
FIG. 1 is a schematic diagram of a conventional optical system including a pump laser.

Referring now to FIG. 1, there is shown a schematic diagram illustrating the optical layout of a conventional optical lens system 100 of a pump laser module. Optical design and related matters are discussed in further detail in W. M. Sherry, C. Gaebe, T. J. Miller and R. C. Schweizer, "High Performance Optoelectronic Packaging for 2.5 and 10 Gb/s Laser Modules," *Proc. of Electronic Components and Technology Conference*, pp. 620–627, 1996.

The pump laser of FIG. 1 is formed from 980 nm laser diode 101, and comprises lenses 102, 103, 104. Ball lens 102 is positioned in front of laser diode 101 to collect the divergent beam produced by the diode. The beam is collimated after it passes through ball lens 102. A field lens 103 is disposed to focus the collimated beam, and the beam thereafter passes through a focal point F and again begins to diverge. The divergent beam is then intercepted by a third lens 104 that corrects for spherical aberration and re-focuses the beam. When a conventional 980 nm pump laser beam propagetes through a system such as conventional optical lens system 100, the horizontal far-field angle may vary from 6° to 12° (FWHM), and the vertical far-field may vary from 20° to 35° (FWHM). An exemplary pair of angles may be 9° for the horizontal and 30° for the vertical. This give rise to an elliptical beam pattern. As the beam propagates through this system, the ellipticity of the beam is not corrected.

Figure 2:
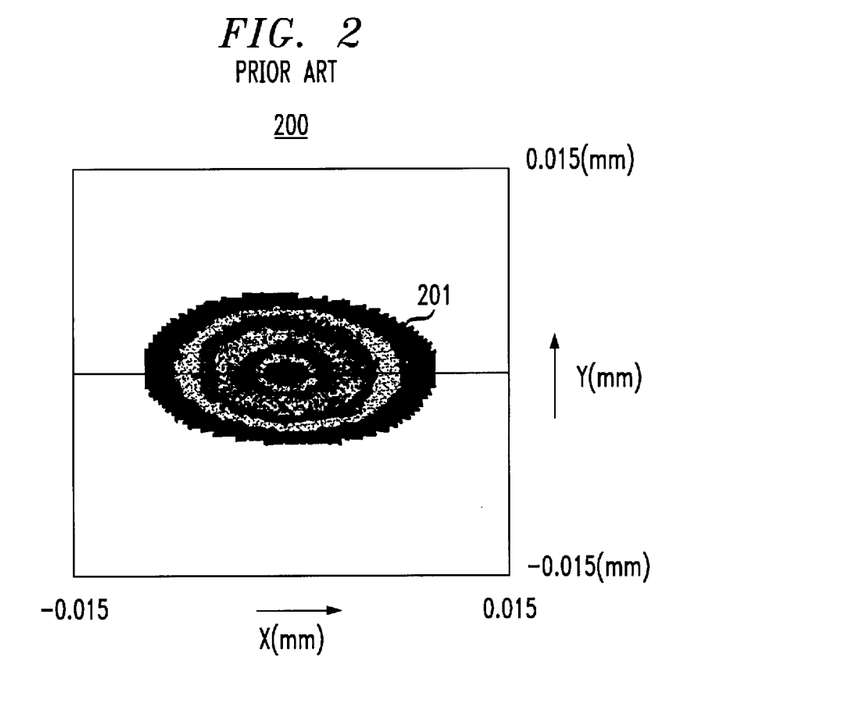
FIG. 2 is an illustration of an elliptical laser beam pattern produced by the conventional optical system of FIG. 1 for a 980 nm laser diode.

Referring now to FIG. 2, there is shown an illustration 200 of an elliptical beam pattern 201 produced by the conventional optical system 100 for a 980 nm laser diode 101. As shown in FIG. 2, the typical mode-field radii for 980 nm pump lasers are 1.9 $\mu$m and 0.7 $\mu$m for the horizontal (X-axis) and vertical (Y-axis) directions, respectively. When the laser beam passes through optical system 100, the exit beam pattern 201 is elliptical, as shown in FIG. 2. The mode field radii predicted by optical design software simulations are 8.5 $\mu$m in the X axis and 4.6 $\mu$m in the Y axis. Since the mode-field radius for a typical single mode fiber at 980 nm is 3.2 $\mu$m, a significant amount of the optical power will not be coupled into fiber 106. The simulated (calculated) coupling efficiency for system 100, with a typical 980 nm laser 101, is only 59%.

Thus, 980 nm pump lasers often exhibit poor coupling efficiency due to the elliptical beam pattern produced. The main reason for this ellipticity is the relatively weak index waveguide provided by the ridge waveguide laser structure in GaAs substrates. Although a strong index guided waveguide can be easily fabricated in InP, it cannot be easily fabricated with GaAs, the material used to fabricate 980 nm lasers. Thus, with a comparatively weak index waveguide, the pump laser requires wider width, and the aspect ratio between horizontal and vertical apertures becomes large, implying an elliptical-shaped beam. The ratio for 980 nm (GaAs) pump lasers is typically from 2.5 to 5.

Pump lasers with a large aspect ratio will result in a poor coupling efficiency (CE) when the light is coupled to a single-mode fiber (e.g., of an EDFA) by using conventional optical design, because the single-mode fiber requires a circular mode field pattern for high CE. The larger the aspect ratio is, the more degradation there will be in the coupling efficiency. For typical 980 nm lasers, the degradation can be severe with more than 3 dB penalty in the fiber-coupled power. The primary reason for this degradation is the mismatch in the mode field diameters along the major and minor axes of the beam.

Several schemes have been proposed to improve this coupling efficiency. One approach, based on a virtual point source lens, corrects the mode mismatch but requires very tight angular tolerance. Another approach, based on a wedged fiber lens, also corrects the mode mismatch but requires very tight offset tolerance. These approaches are described, respectively, in *Virtual Point Source Optics for Laser Diodes* (Blue Sky Research, 1994) <http:\\www.blueskyresearch>; and R. A. Modavis & T. W. Webb, "Anamorphic Microlens for Laser Diode to Single-Mode Fiber Coupling," *IEEE Photonics Tech. Let.*, Vol. 7, No. 7, pp. 798–800, 1995.

The wedged fiber micro-lens solution to this coupling efficiency problem, for example, which employs an anamorphic fiber micro-lens, can achieve a CE of about 70%. However, the microlens requires very stringent alignment tolerances. Additionally, the ellipticity of the launched beam may vary, depending upon the manufacturer (for example, the ratio of far-field angles between the vertical and horizontal directions can vary from 2.5 to 4.5, depending upon the manufacturer). Thus, even the best anamorphic micro-lens design may not be suitable for all situations.

There is a need, therefore, for an improved 980 nm pump laser and means for improving the coupling efficiency of elliptical beams into a single-mode optical fiber.

SUMMARY

A lens system defined along an X-Y-Z coordinate system transforms an elliptical optical beam defined as exhibiting a first, fast axis component and a second, slow axis component, into an essentially circular optical beam. A first and a second lens intercepts the elliptical beam and a cruciform cylindrical lens is disposed to intercept the output from the second lens. The cruciform cylindrical lens has a fast lens and a slow lens, the fast lens having a first, front cylindrical surface oriented along the X axis of the coordinate system for magnifying the first, fast axis component, the slow lens having a second, rear cylindrical surface oriented along the Y-axis of the coordinate system for magnifying the second, slow axis component, wherein the magnifications are determined to provide an essentially circular output beam, said cruciform cylindrical lens disposed such that the optical beam exiting the second lens impinges the first, front cylindrical surface. At least one of the first lens, the fast lens, and the slow lens is adjusted in the Z-axis of the coordinate system to reduce any astigmatism in the optical beam caused by said transformation.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, the coupling efficiency (CE) of an optical system is improved by correcting the elliptical beam with an anamorphic optical system to provide a more circular beam. In this system, an anamorphic cruciform cylindrical (CC) lens is employed instead of the conventional collimating corrective lens used in conventional optical system 100, to transform an elliptical beam output from a laser source into an essentially symmetrical beam suitable for coupling into a single mode fiber. As used herein, the term "cruciform" refers to a component formed or arranged in the shape of a cross.

In one embodiment of the present invention, a two-element (or "discrete") CC lens is formed by combining a pair of cylindrical lenses whose symmetry axes are disposed perpendicular to one another. The pair of lenses are inserted in the optical beam path between a laser source and a single mode fiber such that the first cylindrical lens has its main axis along the optical system's X axis and is used to focus the beam component present in the most divergent direction (i.e., the Y axis direction, also referred to herein as the "fast axis"). The second cylindrical lens has its main axis along the system's Y axis and is therefore used to focus the component present in the least divergent direction (i.e., the X axis direction, also referred to herein as the "slow axis").

This approach thus corrects ellipticity by changing the corrective lens instead of by changing the first lens in the conventional optical design. Unlike the latter approach, replacing the corrective lens with the cruciform cylindrical lens of the present invention ensures that the front end of the packaging is compatible with existing automatic manufacturing processes. It is an advantage of the arrangement of the present invention that the utilization of a cruciform cylindrical lens improves the alignment tolerance of an optical system when compared with conventional anamorphic lens arrangements. That is, the ability to separately control the beam magnification along each axis allows the user to tailor the lens design to the specific optical system.

The anamorphic optical system transforms the elliptical beam into a circular one. This also results in astigmatism in the corrected, near circular or symmetric beam. The alignment tolerances of such an anamorphic optical system are smaller than can be handled by present-day automatic manufacturing processes. Use of automatic manufacturing processes to make such a system would result in a very low yield and performance. However, correcting the astigmatism produced by the elliptical-to-circular transformation can help relax the alignment tolerances for the optical system and allow automatic manufacturing processes to be utilized more feasibly. The present invention, therefore, relaxes these alignment tolerances by providing for astigmatic compensation by Z-axis adjustment of the slow lens of the cruciform cylindrical lens of the anamorphic optical system.

The nominal specifications for a given system may be determined by computer simulation techniques, for example. First, the beam spot size is matched. In an embodiment, to match the spot size the optical system needs to have a magnification of approximately 1.7 in the X axis and 4.6 in the Y axis. This "undoes" the ellipticity of the beam pattern otherwise produced by such an optical system. Next, the desired value of the aspheric constant is determined, while optimising the position of the slow lens in the Z axis to reduce aberration (astigmatism) and to increase the optical CE. The specifications and results given in the description below are based on a Hygens-Fresnel propagation method type simulation. Such simulation software may be obtained from SOLSTIS photonics design software by OPTIS Inc., France. Unlike the ABCD propagation, this method considers aberrations and diffraction phenomena. ABCD propagation is described in further detail in A. Yariv, *Introduction to Optical Electronics*, Ch. 3.

Figure 3:
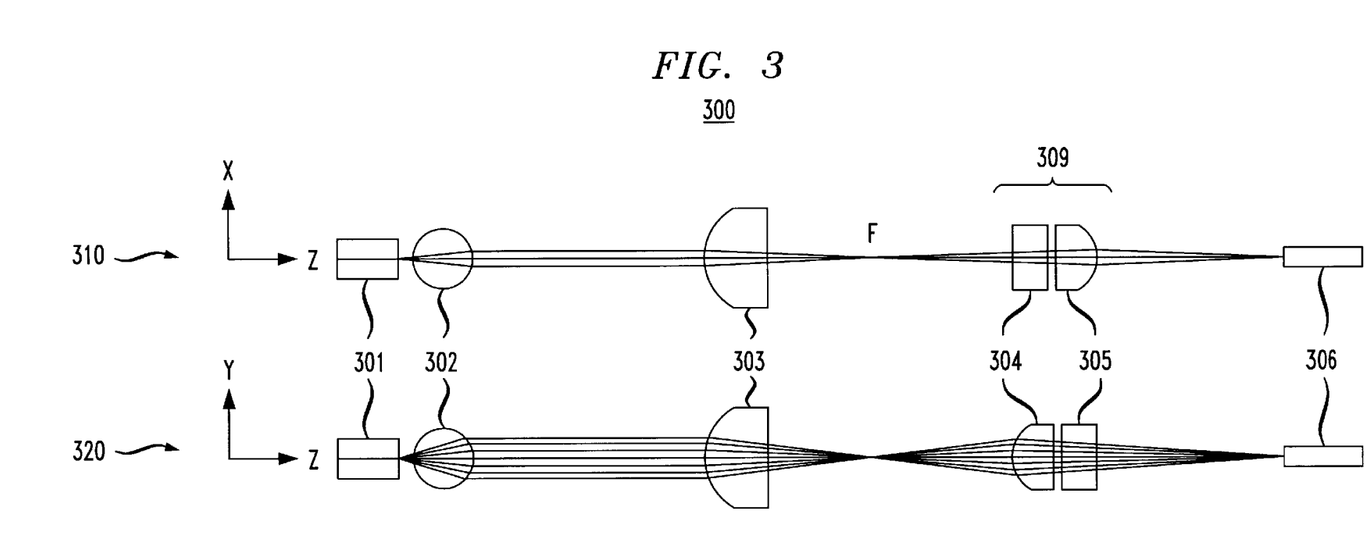
FIG. 3, there is shown an improved optical system employing a cruciform cylindrical lens for correcting an elliptical beam.

Referring now to FIG. 3, there is shown an improved optical system 300 employing a cruciform cylindrical (CC) lens 309 for correcting an elliptical beam. Optical system 300 contains components of a pump laser module. An optical system employing this approach is described in U.S. patent application Ser. No. 09/073,544, filed May 6, 1998, now U.S. Pat. No. 5,973,853 entitled "Cruciforn Cylindrical Lens for Elliptical Beam Transformation," the entirety of which is incorporated herein by reference. In optical system 300, the last lens 309 is an anamorphic CC lens instead of a conventional corrective lens. CC lens 309 comprises two cylindrical lenses, fast lens 304 and slow lens 305. These may be discrete lenses, or part of a monolithic CC lens structure in which fast and slow lenses 304, 305 are opposing cylindrical endfaces of a monolithic CC lens.

Figure 6:
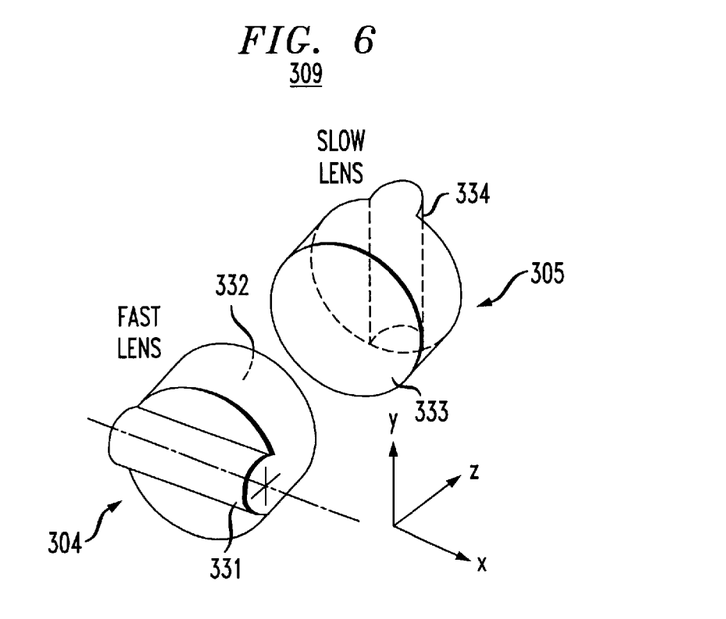
FIG. 6 is an isometric view of the fast and slow lens components of the cruciform cylindrical lens of the optical system of FIG. 3.

Fast lens 304 comprises a flat rear surface 332 (not shown) and a cylindrical front surface 331, as shown in FIGS. 3 and 6. When placed in an optical system, fast cylindrical lens 304 is disposed such that the main axis of cylindrical front surface 331 is along the X direction of the optical system, as indicated in FIG. 3. In accordance with the teachings of the present invention, the fast cylindrical lens 304 is therefore used to focus the light signal present along the "fast diverging" (Y axis) direction. Slow cylindrical lens 305, as shown in FIGS. 3 and 6, includes a flat front surface 333 and a cylindrical rear surface 334. When disposed in optical system 300, the main axis of slow cylindrical lens 305 is oriented perpendicular to that of fast cylindrical lens 304 (that is, such that the main axis of the cylindrical portion of slow lens 305 is along the system Y axis) and disposed such that rear surface 332 of fast lens 304 is parallel to front surface 333 of slow lens 305. As shown in FIGS. 3 and 6, slow lens 305 is oriented such that the main axis of its cylindrical rear surface 334 is aligned with the Y-axis of the optical system. With this orientation, slow lens 305 is used to focus the light signal present along the "slow diverging" (X-axis) direction.

The pump laser of system 300 is formed from 980 nm laser diode 301. The aperture of laser diode 301 produces an elliptical beam because of the inherent characteristics of 980 nm lasers and GaAs substrates. Similar to conventional optical system 100, a ball or spherical lens 302 of optical system 300 is positioned in front of laser diode 301 to collect the divergent (and elliptical) beam produced by the diode. The beam is collimated after it passes through ball lens 302. A field lens 303 is disposed to intercept and focus the collimated (but still elliptical) beam exiting ball lens 302. The beam thereafter passes through a focal point F and again begins to diverge. The (elliptical) divergent beam is then intercepted by CC lens 309. CC lens 309 corrects for spherical aberration and re-focuses the beam, and also corrects the ellipticity of the beam, as described in further detail below. The now-circular or symmetrical beam is then applied to fiber 306, which has a circular aperture input.

Two perpendicular views 310, 320 of optical system 300 are illustrated in FIG. 3, showing cross-sectional views of optical system 300 in the X-Z plane and Y-Z plane, respectively. Fast lens 304 is formed to include a cylindrical lens surface appropriate for the Y axis magnification and slow lens 305 is formed to include a cylindrical lens surface appropriate for the X axis magnification. Thus, lenses CC lens 309 provides separate magnification along the X axis and the Y axis. By virtue of separating the magnification along these axes, better mode matching (between the mode fields of an elliptical source and a circular single-mode fiber) may be achieved.

Figure 4:
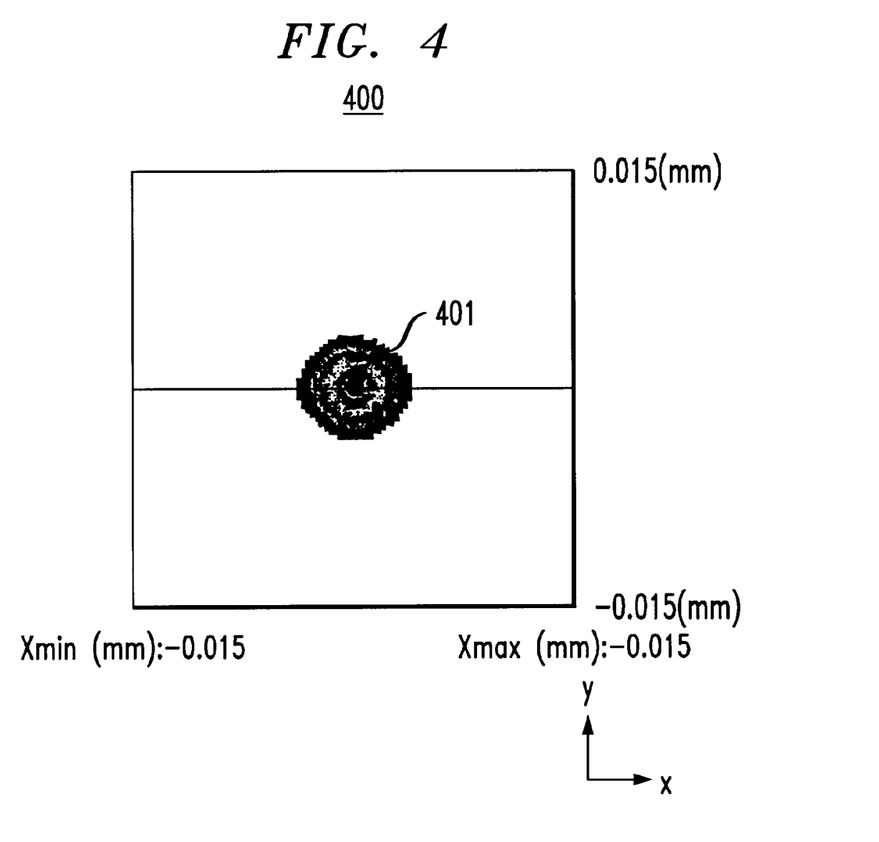
FIG. 4 is an illustration of a near circular laser beam pattern produced by the optical system of FIG. 3 for a 980 nm laser diode.

Referring now to FIG. 4, there is shown an illustration 400 of a near circular laser beam pattern 401 produced by optical system 300 of FIG. 3 for a 980 nm laser diode 301. As shown, the beam pattern 401 is nearly circular, with mode field radii of 3.3 μm in X axis and 3.2 μm in Y axis. The beam has been reshaped from elliptical to nearly circular, due to the different optical magnifications of the elliptical beam caused by lenses 304, 305 in the X and Y axes, to match very closely with the beam in a single mode fiber. The simulated coupling efficiency for the improved system is 90%. This represents more than 50% improvement.

CC lens 309 is composed of two cylindrical lenses 304, 305 perpendicular to each other. Referring now to FIG. 6, there is shown an isometric view illustrating the fast and slow lenses 304, 305 of CC lens 309 of optical system 300 in further detail. As noted above, in one embodiment of the present invention, CC lens 309 is a two-element or discrete CC lens formed by combining cylindrical lenses 304, 305. In an alternative embodiment, CC lens 309 may be a monolithic CC lens structure, in which a monolithic CC lens is formed to comprise opposing cylindrical endfaces, a first endface having its main axis along system's X axis and the second endface having its main axis along the system's Y axis.

The first lens, fast lens 304, has its main axis along the X axis, as shown, and is used to focus the incoming beam in the "fast" diverging direction. For this reason, it is referred to herein as the fast lens. The second lens, slow lens 305, has its main axis along the Y axis and is used to focus the beam in the "slow" diverging direction; it is therefore referred to herein as the slow lens. Slow lens 305 is closer along the Z axis to single-mode optical fiber 306 in order to provide smaller magnification. Thus, fast lens 304 provides more magnification (in the Y direction) than slow lens 305 provides in the X direction, therefore correcting the elliptical beam pattern shown in FIG. 2, because the elliptical pattern 201 is shorter in the Y direction and thus needs comparatively more magnification in the Y direction to provide a more circular beam pattern as shown in FIG. 4.

In an embodiment, fast lens 304 has a thickness of 0.8 mm and a radius of curvature in the Y axis, $R_y$, of about 0.967 mm with a fourth-order aspheric coefficient, $A_{4y}$, of about $-0.250$ $mm^{-4}$. The subscript "4y" refers to the fourth order coefficient in the lens's surface equation. The radius of curvature in the X axis for fast lens 304 is infinity. In an embodiment, slow lens 305 has a thickness of about 0.8 mm and a radius of curvature in the X axis, $R_x$ of about $-0.750$ mm with a fourth-order aspheric coefficient, $A_{4x}$, of about 0.600 $mm^{-4}$. The radius of curvature in the Y axis for slow lens 305 is infinity. As will be understood, although CC lens 309 transforms the elliptical beam to a near circular beam, the different magnifications required in the X and Y axes to do this, along with any slight misplacement of the ball lens 302 with respect to pump laser 301, give rise to astigmatism in the beam provided to fiber 306.

Figure 5:
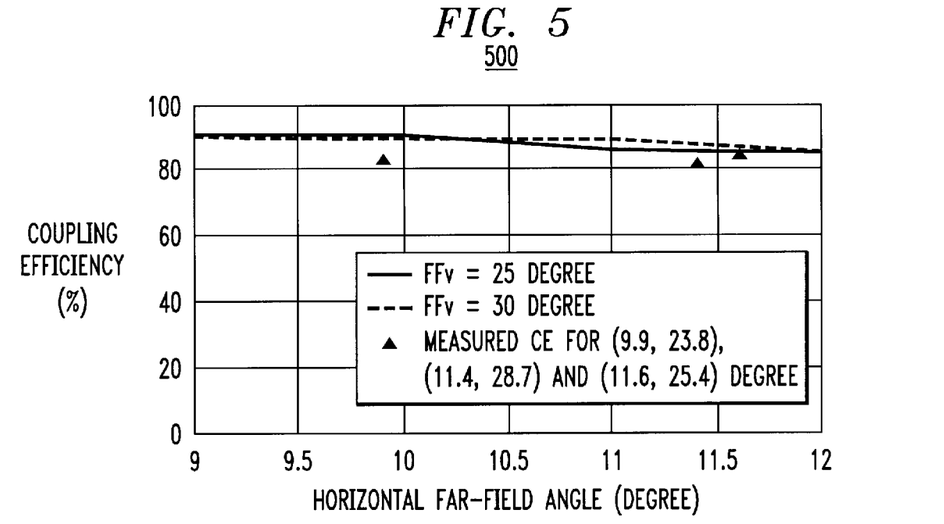
FIG. 5 is a graph illustrating the coupling efficiency (CE) between the pump laser and optical fiber of the optical system of FIG. 3, as a function of horizontal far-field angle for two different vertical far-field angles of 25 and 30 degrees.

Referring now to FIG. 5, there is shown a graph 500 illustrating the coupling efficiency (CE) between the pump laser of system 300 (i.e. laser diode 301 and its output laser beam) and optical fiber 306, as a function of horizontal far-field angle for two different vertical far-field angles (FFv) of 25 and 30 degrees. The two curves shown in FIG. 5 are simulated CE curves, based on specified FFv. Three triangular marks are shown showing the actual measured CE for three different horizontal and vertical far-field angle combinations. As can be seen, the two simulated curves are close each other. CE is defined as the fiber power divided by the laser front facet power (i.e., the power from the front of laser diode 301) with a numerical aperture of 0.5. The highest CE is about 90%. The CE variation from 9 to 12 degree of horizontal far-field angle is less than 10%.

The inventors have also simulated fiber alignment tolerances for the improved optical system of FIG. 3. The 10% off-peak tolerances for X, Y, and Z axes are 0.9 µm, 0.9 µm, and 19.5 µm, respectively. Table 1, below, compares the 10% alignment tolerances with those of high coupling fiber micro-lenses The Y offset for fiber alignment is the most critical one for fabricating the laser module. In the Y direction, the alignment tolerance has been relaxed from 0.29 µm to 0.9 µm with more than three times relaxation. This provides a significant improvement in the yield for a laser welding process, for example.

TABLE 1

10% fiber alignment tolerance comparison

| Design | $\Delta X_{10\%}$ (µm) | $\Delta Y_{10\%}$ (µm) | $\Delta Z_{+10\%}$ (µm) | $\Delta Z_{-10\%}$ (µm) |
|---|---|---|---|---|
| Micro-lens | 0.74 | 0.29 | 2.54 | 2.03 |
| CC lenses | 0.9 | 0.9 | 19.5 | 19.5 |

Figure 7:
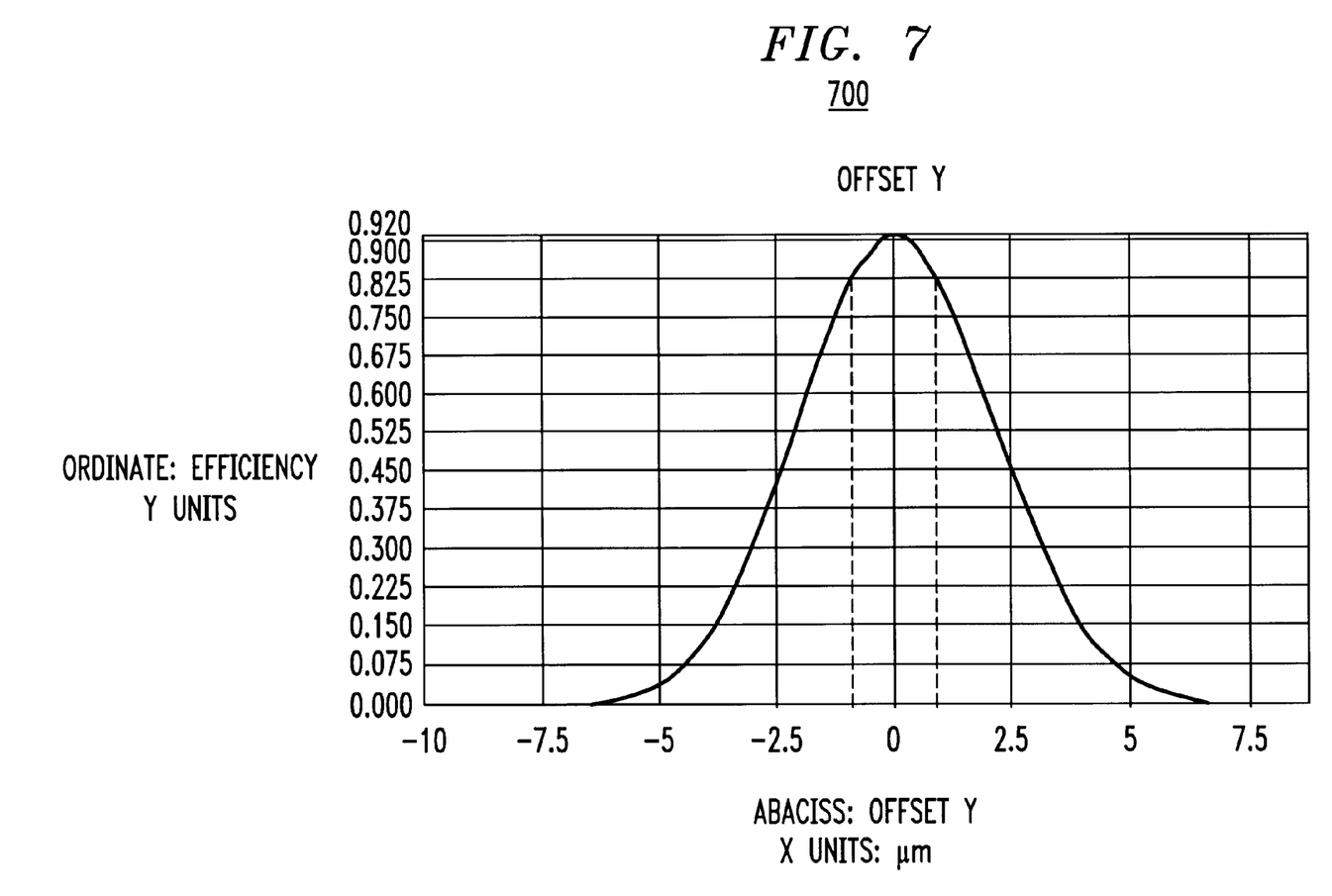
FIG. 7 is a graph showing the fiber alignment curve for CE versus Y offset.

Referring now to FIG. 7, there is shown a graph 700 showing the fiber alignment curve for CE versus Y offset. Referring once more to FIG. 5, graph 500 also shows the result of bench-top coupling measurements for 980 nm laser with different far-field angles. The highest measured CE was 85% for a laser with far-field angle of 11.6 degrees horizontally and 25.4 degrees vertically. The nominal gap between the laser front facet and ball lens 302 was 50 µm, between the ball lens and field lens 303 3.67 mm, between the field lens and fast lens 304 5.44 mm, between the fast lens and slow lens 305 1.00 mm, and between the slow lens and fiber 306 1.54 mm. Table 2, below, lists the alignment tolerances, in one embodiment of the present invention, for ball lens 302, field lens 303, fast lens 304, slow lens 305, and single-mode optical fiber 306.

TABLE 2

10% alignment tolerances

| Optics | $\Delta X_{10\%}$ (µm) | $\Delta Y_{10\%}$ (µm) | $\Delta Z_{+10\%}$ (µm) | $\Delta Z_{-10\%}$ (µm) |
|---|---|---|---|---|
| Ball Lens | 5 | 6 | 1.2 | 1.2 |
| Field Lens | 50 | 95 | 100 | 170 |
| Fast Lens | 1000 | 7.5 | 150 | 370 |
| Slow Lens | 18 | 910 | 40 | 30 |
| Fiber | 0.9 | 1.0 | 20 | 29 |

Since the ball lens is placed passively in the front of laser, the tolerance is about six times tighter than that of the process tolerance. Therefore, it is imperative to relax the alignment tolerance for the ball lens. The reason for the tight tolerance requirements for ball lens 302 arises because of the astigmatism due to the different magnifications needed to transform an elliptical laser aperture into a circular image aperture. Therefore, the astigmatism otherwise present in the corrected beam output by CC lens 309, is corrected so that the alignment tolerance for ball lens 302 can be relaxed.

Figure 8:
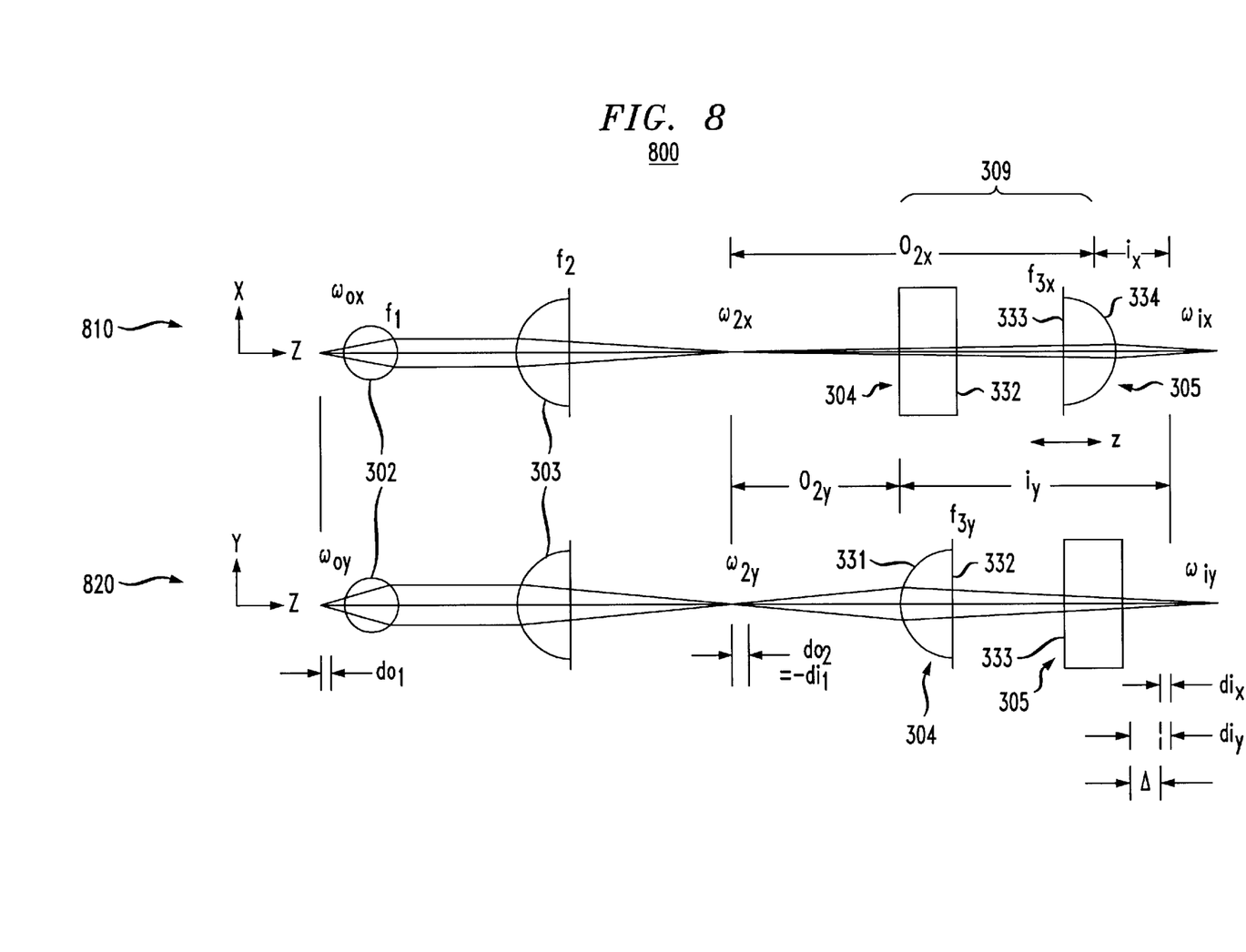
FIG. 8 is a schematic diagram illustrating the Z adjustment of the slow lens of the optical system of FIG. 3 for astigmatic correction, in accordance with an embodiment of the present invention.

In the present invention, the astigmatism is corrected by a Z axis adjustment of slow lens 305. Referring now to FIG. 8, there is shown a schematic diagram 800 illustrating the Z adjustment of slow lens 305 of the exemplary lens system of optical system 300, for astigmatic correction, in accordance with an embodiment of the present invention. Two perpendicular views 810, 820 of optical system 300 are illustrated in FIG. 8, showing cross-sectional views in the X-Z plane and Y-Z plane, respectively.

As illustrated in view 810, CC lens 309 is oriented in the X-Z plane such that the "slow" diverging light signal will travel through cylindrical surface 334 of slow lens 305. As shown in view 820, CC lens 309 is oriented in the Y-Z plane such that the "fast" diverging light signal will travel through cylindrical surface 331 of fast lens 304. As noted above, CC lens 309 may be comprised of discrete lenses 304, 305, or may be a monolithic CC lens structure in which fast and slow lenses 304, 305 are opposing cylindrical endfaces of a monolithic CC lens. In an embodiment, rear surface 332 of fast lens 304 and front surface 333 of slow lens 305 are separated by a relatively small gap (approximately 1 mm, for example). Thus, in accordance with the present invention, a monolithic cruciform cylindrical lens may be used in place of a pair of discrete cylindrical lenses.

Views 810, 820 of FIG. 8 illustrate the relationship between the changes in the object plane and the image plane. The slight shift in the ball lens position, $do_I$, will result in a shift for the slow beam, $di_x$, and for the fast beam, $di_y$. The difference between these two image shifts may be referred to as the astigmatic distance, $\Delta$. It can be derived that:

$$\Delta=(m_x^2-m_y^2)\cdot do_I \quad (1)$$

where $m_x$ is the magnification of the image in the X direction and $m_y$ is the magnification of the image in the Y direction. The factor $m_x$ can be expressed as:

$$m_x = \omega_{Ix}/\omega_{Ox} \qquad (2)$$

where $\omega_{Ox}$, $\omega_{Ix}$ are the mode field radii of the laser beam in the Y direction at the object and image planes, respectively. Similarly, the factor my can be expressed as:

$$m_y = \omega_{Iy}/\omega_{Oy} \qquad (3)$$

where $\omega_{Oy}$, $\omega_{Iy}$ are the mode field radii of the laser beam in the Y direction at the object and image planes, respectively.

In an embodiment, the measured values of $\omega_{Ix}$ and $\omega_{Iy}$ are 3.2 µm and 3.8 µm, respectively. Therefore, from Eq. (1), $\Delta = -25\, do_f$. This implies that I µm offset between laser diode 301 and ball lens 302 creates 25 µm in astigmatic distance at the image plane. This is the source of the tight alignment tolerance requirement between laser and ball lens.

In the present invention, this astigmatism is compensated for by appropriately repositioning the position of the slow lens in the Z axis. The reason is that the astigmatic distance $\Delta$ is due to the different shifts $di_x$ and $di_y$ for the fast and slow beams, respectively. By moving the slow lens 305 along the Z axis, the difference in the shifts in $di_x$ and $di_y$ can be reduced or eliminated. This may be done, for example, after the pump laser module comprising optical system 300 is first fabricated, by placing the components of optical system 300 in an alignment station or other device sufficient to move the lenses, in particular the slow lens 305, along the Z axis.

In an embodiment, ball lens 302 is fabricated with a fixed position with respect to diode 301. If its tolerance is not exact, i.e. if the ball lens is even slightly off of the nominal Z position it is supposed to have in accordance with the design specifications, there may be astigmatism in the beam within fiber 306. The effects of any such astigmatism will be visible in the beam pattern, due to the astigmatic distance, $\Delta$, resulting from different Z-axis shifts for the slow beam, $di_x$, and for the fast beam, $di_y$. Thus, to determine whether or how much to adjust slow lens 305, a CCD device may be inserted to receive the light from slow lens 305 and fast lens 304, near where the optical fiber 306 is specified to receive this light, so that the beam pattern therein may be viewed on a monitor. Slow lens 305 is preferably repositioned by observing the output image, i.e. the beam pattern, on the monitor. The user adjusts the Z position of slow lens 305 until a perfect circular shape is observed by the CCD device at a given Z position. The reposition of the slow lens will minimize the $\Delta$ by bringing the X image to the location of the Y image. After the astigmatism is reduced as much as possible and the beam pattern is as spherical as possible, the current Z position of slow lens 305 may be anchored, e.g. by laser welding its current position. Other components of system 300 which are not yet anchored may also be anchored at this time. For example, the position of the optical fiber 306 may be set and anchored to receive the output of CC lens 309 at the Z-axis point where the CCD device detected an optimally-adjusted circular beam pattern, i.e. at the point where the X and Y images coincide. Optical system 300 may then be mounted in a housing for use.

In an embodiment in which CC lens 309 is monolithic, the entire monolithic CC lens 309 is adjusted along the Z axis to correct for astigmatism. In an alternative embodiment, the astigmatism is corrected by a Z axis adjustment of ball lens 302 instead of, or in addition to, a Z axis adjustment of slow lens 305, although it may be more difficult to achieve precise fine-adjustment of ball lens 302 because only 1 µm offset between laser diode 301 and ball lens 302 creates 25 µm in astigmatic distance at the image plane.

Figure 9:
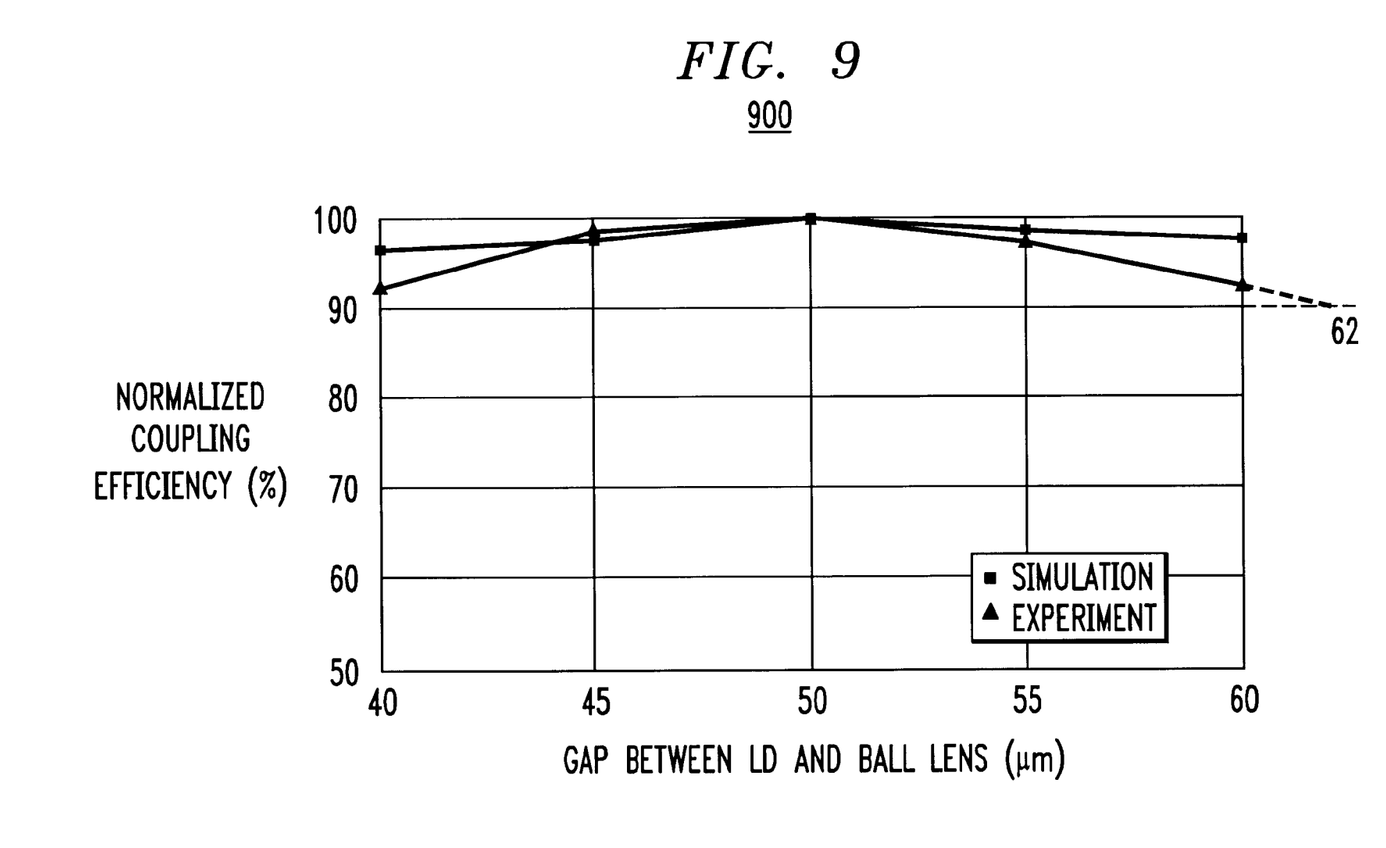
FIG. 9 is a graph illustrating simulated and experimental results of the normalized CE after the astigmatic compensation of the present invention.

Referring now to FIG. 9, there is shown a graph 900 illustrating simulated and experimental results of the normalized CE between the pump laser 301 and optical fiber 306 of optical system 300 after the astigmatic compensation of the present invention. The 10% alignment tolerance has been increased from about 1.2 µm to about 12 µm. This represents a ten time improvement.

Accordingly, in the present invention, a cruciform cylindrical lens is utilized in an optical system having a laser diode with a large aspect ratio and an elliptical beam pattern. In an embodiment, a CE of 85% for a single-mode fiber is obtained, which represents more than 3 dB improvement over conventional optical systems. The fiber alignment tolerance is about three times more relaxed than that of the wedged fiber lens. Moreover, the astigmatic compensation technique of the present invention reduces the stringent tolerance requirement between the laser and the ball lens by more than ten times. This makes passive fabrication processes for the laser and the ball lens more feasible.

The present invention has been described above with respect to transforming an elliptical laser beam of a 980 nm GaAs laser into a more symmetrical or circular beam, with a cruciform cylindrical lens, and for correcting the astigmatism caused by such transformation, by appropriate Z-axis adjustment of the slow lens of the CC lens. In alternative embodiments, the present invention may be employed with any wavelength laser beam which has an elliptical emission beam. Thus, the present invention may be employed, with appropriate adjustments to the parameters in the above description, for example, with GaAs lasers having a center wavelengths from about 600 nm to about 1000 nm and for InP lasers from about 1000 nm to about 1600 nm. The typical range for a 980 nm pump laser is from 970 nm to 990 nm. GaAs lasers can produce beams from about 600 nm to about 1000 nm. 980 nm beams are produced only by GaAs for semiconductor pump lasers.

In general, a cruciform cylindrical lens can be employed with any elliptical beam to transform it to a circular beam. Such a cruciform elliptical-to-circular transformation can potentially cause astigmatism in the beam. Thus, the present invention, in general, provides a method for correcting astigmatism in a circular laser beam which is produced by a cruciform cylindrical lens system transforming an elliptical beam to a circular beam. Accordingly, in alternative embodiments, the astigmatic correction of the present invention may be employed with laser beams other than 980 nm laser beams.

The present invention has been described above with respect to an anamorphic optical system comprising a ball or spherical lens, a field lens, and a CC lens for transforming an elliptical beam into an essentially circular beam. In alternative embodiments, the astigmatism correction of the present invention may be applied, in general, to an anamorphic optical system employing an anamorphic lens for transforming an elliptical beam into an essentially circular beam, whether or not the ball and/or field lens are present. For example, in an alternative embodiment, the elliptical beam output by a pump laser such as pump laser 301 may be applied directly to a CC lens such as CC lens 309, which transforms the elliptical beam into a more circular beam and provides this transformed beam to a single-mode fiber such as fiber 306. In such an embodiment, if the CC lens is not positioned at the precise, specified distance along the Z axis from the pump laser, there may be an astigmatism in the transformed beam. Therefore, adjusting the CC lens along the Z axis in such an embodiment can be done to reduce said astigmatism.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for transforming an elliptical optical beam defined as exhibiting a first, fast axis component and a second, slow axis component, into an essentially circular optical beam with a lens system, the lens system defined along an X-Y-Z coordinate system and comprising:
   a first and a second lens for intercepting the elliptical optical beam; and
   a cruciform cylindrical lens disposed to intercept the output from the second lens, said cruciform cylindrical lens comprising a fast lens and a slow lens, the fast lens having a first, front cylindrical surface oriented along the X axis of the coordinate system for magnifying the first, fast axis component, the slow lens having a second, rear cylindrical surface oriented along the Y-axis of the coordinate system for magnifying the second, slow axis component, wherein the magnifications are determined to provide the essentially circular optical beam, said cruciform cylindrical lens disposed such that the optical beam exiting the second lens impinges the first, front cylindrical surface, the method comprising the step of adjusting at least one of the first lens, the fast lens, and the slow lens in the Z-axis of the coordinate system to reduce any astigmatism in the optical beam caused by said transformation.

2. The method of claim 1, wherein the fast lens is a first cylindrical lens including the first, front cylindrical surface and a flat rear surface, and the slow lens is a second cylindrical lens including the second, rear cylindrical surface and a flat front surface, said first and second cylindrical lenses disposed such that the respective flat surfaces are adjacent and parallel and the cylindrical surfaces are perpendicular.

3. The method of claim 1, wherein the cruciform cylindrical lens is monolithic.

4. The method of claim 3, wherein the step of adjusting comprises the step of adjusting the monolithic lens in the Z-axis of the coordinate system to reduce said astigmatism.

5. The method of claim 1, wherein the step of adjusting comprises the step of adjusting the slow lens in the Z-axis of the coordinate system to reduce said astigmatism.

6. The method of claim 1, wherein:
   the first lens is a ball lens for receiving the elliptical beam from a pump laser and for creating a collimated elliptical beam; and the second lens is a field lens for intercepting and focussing the collimated elliptical beam.

7. The method of claim 6, wherein the step of adjusting comprises the step of adjusting the ball lens in the Z-axis of the coordinate system to reduce said astigmatism.

8. The method of claim 6, wherein:
   said magnification in the X axis is different from the magnification in the Y axis; and
   said astigmatism is caused by said different magnifications and by a misplacement of the ball lens in the Z axis with respect to the pump laser.

9. The method of claim 8, wherein the magnification in the X axis is approximately 1.7 and the magnification in the Y axis is approximately 4.6.

10. The method of claim 1, comprising the further step of anchoring said adjusted lens after said adjustment.

11. The method of claim 10, comprising the further steps of receiving the elliptical optical beam from a pump laser, transforming said elliptical beam into the essentially circular optical beam with the lens system, and providing said essentially circular optical beam to a single-mode optical fiber.

12. The method of claim 1, wherein the elliptical optical beam is provided by a GaAs semiconductor pump laser and the elliptical optical beam has a wavelength of approximately 980 nm.

13. A method for forming a lens system for transforming an elliptical optical beam defined as exhibiting a first, fast axis component and a second, slow axis component, into an essentially circular optical beam, the lens system defined along an X-Y-Z coordinate system, the method comprising the steps of:
   (a) forming a lens system having a first and a second lens for intercepting the elliptical optical beam, and a cruciform cylindrical lens disposed to intercept the output from the second lens, said cruciform cylindrical lens comprising a fast lens and a slow lens, the fast lens having a first, front cylindrical surface oriented along the X axis of the coordinate system for magnifying the first, fast axis component, the slow lens having a second, rear cylindrical surface oriented along the Y-axis of the coordinate system for magnifying the second, slow axis component, wherein the magnifications are determined to provide the essentially circular output beam, said cruciform cylindrical lens disposed such that the optical beam exiting the second lens impinges the first, front cylindrical surface; and
   (b) adjusting at least one of the first lens, the fast lens, and the slow lens in the Z-axis of the coordinate system to reduce an astigmatism in the optical beam caused by said transformation.

14. A lens system for transforming an elliptical optical beam defined as exhibiting a first, fast axis component and a second, slow axis component, into an essentially circular optical beam, the lens system defined along an X-Y-Z coordinate system, wherein the lens system is formed in accordance with the following steps:
   (a) forming an initial lens system having a first and a second lens for intercepting the elliptical optical beam, and a cruciform cylindrical lens disposed to intercept the output from the second lens, said cruciform cylindrical lens comprising a fast lens and a slow lens, the fast lens having a first, front cylindrical surface oriented along the X axis of the coordinate system for magnifying the first, fast axis component, the slow lens having a second, rear cylindrical surface oriented along the Y-axis of the coordinate system for magnifying the second, slow axis component, wherein the magnifications are determined to provide the essentially circular output beam, said cruciform cylindrical lens disposed such that the optical beam exiting the second lens impinges the first, front cylindrical surface; and
   (b) adjusting at least one of the first lens, the fast lens, and the slow lens in the Z-axis of the coordinate system to reduce an astigmatism in the optical beam caused by said transformation.

15. A method for transforming an elliptical optical beam defined as exhibiting a first, fast axis component and a second, slow axis component, into an essentially circular optical beam with a lens system, the lens system defined along an X-Y-Z coordinate system and comprising a cruciform cylindrical lens disposed to intercept the elliptical optical beam, said cruciform cylindrical lens comprising a fast lens and a slow lens, the fast lens having a first, front cylindrical surface oriented along the X axis of the coordinate system for magnifying the first, fast axis component, the slow lens having a second, rear cylindrical surface oriented along the Y-axis of the coordinate system for magnifying the second, slows axis component, wherein the magnifications are determined to provide the essentially circular optical beam, said cruciform cylindrical lens disposed such that the elliptical optical beam impinges the first, front cylindrical surface, the method comprising the step of adjusting at least the slow lens in the Z-axis of the coordinate system to reduce any astigmatism in the optical beam caused by said transformation.

16. The method of claim 15, wherein the fast lens is a first cylindrical lens including the first, front cylindrical surface and a flat rear surface, and the slow lens is a second cylindrical lens including the second, rear cylindrical surface and a flat front surface, said first and second cylindrical lenses disposed such that the respective flat surfaces are adjacent and parallel and the cylindrical surfaces are perpendicular.

17. The method of claim 15, wherein the cruciform cylindrical lens is monolithic and the step of adjusting comprises the step of adjusting the monolithic lens in the Z-axis of the coordinate system to reduce said astigmatism.

18. The method of claim 15, comprising the further step of anchoring said adjusted lens after said adjustment.

19. The method of claim 18, comprising the further steps of receiving the elliptical optical beam from a GaAs semiconductor pump laser, wherein the elliptical optical beam has a wavelength of approximately 980 nm, transforming said elliptical beam into the essentially circular optical beam with the lens system, and providing said essentially circular optical beam to a single-mode optical fiber.

* * * * *